2,992,136
FRICTION MATERIAL

Paul J. Shipe, Xenia, Ohio, assignor to General Motors Corporation, Detroit, Mich., a corporation of Delaware
No Drawing. Filed Oct. 17, 1955, Ser. No. 541,055
4 Claims. (Cl. 117—132)

This invention relates to friction material and is particularly concerned with friction material for use in clutches, brakes and the like.

Present day demands on clutch and brake elements are heavy due to the high horsepower motors being used in automotive vehicles together with the ever-increasing weight of the vehicles. These two factors make it a difficult task to provide clutches and brakes that will withstand the extreme conditions that prevail during high speed operation.

For example, when an automotive vehicle is to be stopped repeatedly from a speed in the order of 70 to 100 miles per hour the usual types of molded nonmetallic friction materials used in brakes are unable to withstand the high temperature conditions and as a result are eventually destroyed or their efficiency is reduced to a point that the brake requires frequent readjustment.

It is an acknowledged fact that metallic brake materials are more desirable because of their resistance toward high temperatures and wear. However, in the past, metallic brake materials in most cases have been noisy and have a tendency to score and abrade the brake drums due to lack of lubrication which self-aggravates wear conditions. Otherwise, metallic materials are highly desirable since they readily withstand the temperature conditions involved in high speed operational stops.

Of the metallic friction materials, porous metal materials have always been most useful due to the fact that in porous metals it is possible to include nonmetallic ingredients as friction fortifying and lubricating agents, thus making the friction material more flexible in its conditions of use. Today many clutches for automotive applications are made from porous metal materials and wide use thereof has proven very satisfactory. However, to date there has been very little use of metallic friction materials in brake applications for the reasons heretofore noted. One other point of extreme importance which makes metallic materials highly desirable for brakes is the constant operational characteristics of the metallic material vs. the nonmetallic. In a molded nonmetallic brake material such as asbestos-cork, asbestos-cotton mixtures bonded together with a thermosetting resin, the coefficient of friction varies widely with the temperature. This is exhibited in a condition called "fade" wherein a brake when applied will cause a vehicle to decelerate at a predetermined rate for a given pressure on the first stop and then on successive subsequent stops the deceleration rate is progressively less at the same pressure until finally it is difficult to stop the vehicle at all. Metallic linings, on the other hand, have a rather constant rate of deceleration even after a plurality of high speed stops which makes them particularly desirable. In U.S. application S.N. 540,842, now abandoned, assigned to the assignee of the present invention and filed concurrently herewith, a new type of metallic friction material is disclosed which eliminates all of the past objections to metallic friction materials particularly for use in brakes. This material is basically ferrous in nature having a high percentage of graphite dispersed therethrough together with a lesser amount of molybdenum disulfide. The material is sintered and forms a brake block which may be coextensively bonded to a strong metal backing member by which it may be attached to the mechanism of a brake. Extensive tests on this material show that it has extremely good frictional properties when used as a brake. It will outlast nonmetallic linings many times, the frictional characteristics are substantially constant and in general it is a greatly improved friction material which, when applied to the brakes of average automotive vehicles, produces heretofore unheard of results.

This material, when applied to an automotive vehicle that is subjected to use in water wherein the use is periodic in nature, absorbs water due to its porous nature which sometimes oxidizes the metal of the brake element. This condition is not apparent when the vehicle is used frequently since use of the brake element will cause a heating thereof which will drive the moisture therefrom. However, if the element is used in contact with water and then stored for an appreciable period of time, a rusting or oxidation is sometimes apparent within the porous body of the element which eventaully reduces the efficiency and life of the element.

This invention is specifically directed to overcoming this condition not only in a ferrous brake element as disclosed in the aforementioned application, but also in any porous metal brake element wherein it is desirable to close the pores to the ingress of fluids deleterious to the life or function of the element.

To this end, I have discovered that certain materials impregnated into the pores of the porous metal brake element provide a coextensive covering over the entire porous surface of the element which inhibits and/or prevents corrosion of the metal of the element. In some cases, this material will substantially fill the pores while in others it forms a protective coating thereover.

In this connection it is important that the impregnant does not change the frictional character of the element and also that if the element reaches a temperature sufficiently high to break down the impregnant that the residue thereof will continue to protect the porous surface of the element from the ingress of fluids and will likewise not detract from the frictional qualities thereof.

One of the materials that I have found to be useful is a resinous material in the form of a furfural-ketone derivative having high temperature stability which is highly desirable for this purpose. This material may be impregnated under vacuum impregnation conditions and cured at a relatively low temperature whereupon the part in which it is impregnated is substantially impervious to moisture or other deleterious fluids. This particular material has the added feature of breaking down under high temperature conditions (temperatures in excess of 750° F.), into substantially pure carbon. This residue of carbon remains in the pores of the brake element and completely coats the pores and, according to extensive tests, prevents oxidation at the internal surfaces of the element. It is apparent that the inclusion of additional carbon in the element will not modify or destroy the functional qualities thereof.

Specifically, the furfural-ketone derivative which I prefer to use is sold under the trade name Fura-Tone. This material and its several modifications is fully disclosed in Patent Nos. 2,600,403 and 2,600,764.

It is apparent from these disclosures that the final product is an infusible condensate of the reaction of furfural-ketone masses. The viscosity of the reaction mixture prior to impregnation is controlled by varying the specific starting ingredients in the mixture and by varying the extent of hydrogenation thereof. These factors form no part of this invention which is specifically directed to the use of a furfural-ketone derivative capable of condensation as an infusible filler within the pores of the friction element.

A specific example of one suitable impregnating material is as follows: 100 parts of Fura-Tone #1347 is mixed with 7 parts of accelerator preferably neutral diethyl sulfate. This mixture is placed in an autoclave and parts to be impregnated therewith are dipped therein at a temperature of between 70° F. and 100° F. A vacuum is applied to the autoclave to remove all air from the porous part and then pressure is applied thereto to force the Fura-Tone impregnant into the evacuated pores of the porous metal part. After the part, or parts, are properly impregnated they are removed from the autoclave and are placed in an oven for curing. This is accomplished at a temperature in the order of 158° F. for about 24 hours after which the temperature is raised to about 302° F. for another two hours.

It is apparent that the temperatures noted above may vary widely, for example, from 150° F. to 212° F. for the first heating step and from 275° F. to 330° F. for the second heating step with similar time conditions, or if the time conditions are changed, it is apparent that the heating conditions may likewise be adjusted, the prime consideration being that the material is properly polymerized. It is also apparent that the addition of accelerator may vary widely in accordance with temperature and time conditions used in the cure and while 7 parts of the accelerator is a preferred addition, this may be adjusted as desired in accordance with temperatures used for curing as is well known in the art.

Another material that is particularly useful for use in the impregnation of the porous article is a silicone resin. In this instance I prefer to use a resin of the methyl phenyl polysiloxane type wherein the material is dissolved in a solvent such as xylene, trichloroethylene, toluene or any other suitable solvent. Such a material is resistant to high temperatures and decomposes at temperatures above 650° F. into substantially pure carbon and silica. These materials in the pores of the porous article protect the same and form a coextensive covering thereover.

Resins of the methyl phenyl polysiloxane type may be purchased on the market, one of which as described above is identified as Dow Corning varnish #996. It is apparent that while this particular designation is directed to one specific varnish, that other materials of the same class are useful. When impregnating a porous part with these siloxanes in volatile solvents it is preferable to merely soak the porous metal part at room temperature for an extended period in the order of four to six hours whereupon the part may be removed from the impregnant and gently heated at temperatures slightly above room temperature to diffuse the solvent whereupon the entire porous surface of the part is coated with the siloxane. Other modifications of the use of this particular impregnant comprehend mixtures of the siloxane resins with alkyd resins or with the aforementioned furfural-ketone derivatives. In the case of these mixtures the siloxane should be present in percentages of from 50% to 75% with the other resins making up the remainder.

Another useful coating for the porous surface of the article which will protect the same against oxidation or corrosion is one derived from immersion of the part in phosphoric acid-manganese sulfate solutions. Such a treatment results in a deposit of manganese phosphate in conjunction with the metal of the part being treated which, in the case of a ferrous element, results in an iron manganese phosphate. Phosphate coatings are well known in the art and one of such treatments is known as "Parkerizing." Specifically, the phosphoric acid and manganese sulfate are used in aqueous solutions into which the part to be impregnated is dipped for from ten to fifteen minutes with the bath being maintained at temperatures in the order of 205° F. to 210° F. After removal from the bath the entire porous surface of the part will be found to have a coextensive phosphate coating thereover.

All of these alternatives produce protective materials within the pores of the part which inhibit and/or prevent oxidation of the part. In the case of the furfural-ketone resin the pores are substantially closed by the impregnant. In the case of the siloxanes, due to the presence of a volatile solvent, the pores are partially closed although the entire porous surface of the article is coated with the material and in the case of the phosphate coating the porous surface of the article is merely coated with the phosphate coating. In each instance, however, the entire porous surface of the part is protected against contact with the atmosphere or with any deleterious fluids which may come in contact with the surface of the part. Thus, in each and every case the deleterious action of extraneous fluids which may contact the friction element is inhibited and/or prevented through the use of a material which protects the entire porous surface of the part.

In all instances I have found that porous metal parts, for example, porous bronze, porous iron parts or specifically the ferrous friction member noted in the copending application above referred to, may all be improved by impregnation with a material which forms a coextensive protection for the metal of the part against the action of deleterious fluids and which is highly resistant to elevated temperatures. In cases where such a material breaks down due to excessive temperatures, it should form a substantially non-reactive residue within the pores which properly protects the part while not detracting from its frictional qualities.

While the forms of embodiment of the invention as herein disclosed constitute preferred forms, it is to be understood that other forms might be adopted, as may come within the scope of the claims which follow.

What is claimed is as follows:

1. A friction element for use as a clutch, brake and the like, comprising; a porous predominantly ferrous metal friction facing made from sintered and compacted metal powders, said friction facing having the surface of its pores substantially covered throughout their entire extent and protected by a covering of a material taken from the class consisting of thermal decomposition products of siloxane resins, the thermal decomposition product of infusible condensates of furfural-ketone derivatives and the reaction product between the ferrous material and a solution of phosphoric acid and manganese sulfate, said covering being of such character and in such quantities that it does not change the frictional characteristics of the element.

2. A friction element for use as a clutch, brake and the like, comprising; a porous predominantly ferrous friction facing made from sintered compacted powders and impregnated with a siloxane resin which is resistant to elevated temperatures and has a decomposition temperature of about 600° F., said siloxane resin being impregnated into the porous facing through a volatile solvent so that the siloxane resin, upon evaporation of the solvent, is disposed on and completely covers the entire porous surface throughout the element for protecting the same against exposure to infiltrated fluids, said siloxane resin, upon heat decomposition thereof, causing a coextensive deposition of a protective layer on the entire porous surface of the facing comprising the thermal decomposition product of said siloxane resin consisting essentially of pure carbon and silicon dioxide, said resin and said decomposition product being of such character and in such quantities that it does not change the frictional characteristics of the element.

3. A friction element for use as a clutch, brake and the like, comprising; a porous predominantly ferrous friction facing made from sintered compacted powders and impregnated with an infusible condensate of furfural-ketone derivative which is heat resistant at temperatures below 500° F., said condensation product being impregnated into the porous facing through a volatile solvent so that the condensation product, upon evaporation of the solvent, is disposed on and completely covers the entire porous surface throughout the element for protecting the same against exposure to infiltrated fluids, said condensation product, upon heat decomposition thereof, causing a coextensive deposition of a protective layer throughout the full extent of the porous surface of the facing comprising the thermal decomposition products of the infusible condensates of furfural-ketone derivatives consisting essentially of pure carbon as a major ingredient, said resin and said decomposition product being of such character and in such quantities that it does not change the frictional characteristics of the element.

4. A friction element for use as a clutch, brake and the like, comprising; a porous predominantly ferrous friction facing made from sintered compacted powders and impregnated with the reaction product between the iron of the facing and an aqueous solution of manganese sulfate and phosphoric acid which reaction product is disposed on and completely covers the entire porous surface throughout the element for protecting the same against exposure to infiltrated fluids, said reaction product being of such a character that it does not change the frictional characteristics of said element.

References Cited in the file of this patent

UNITED STATES PATENTS

| | | |
|---|---|---|
| 2,187,068 | Koehring | Jan. 16, 1940 |
| 2,408,430 | Lowey et al. | Oct. 1, 1946 |
| 2,635,929 | Brophy et al. | Apr. 21, 1953 |
| 2,691,814 | Tait | Oct. 19, 1954 |
| 2,703,768 | Hall | Mar. 8, 1955 |
| 2,743,192 | White | Apr. 24, 1956 |